United States Patent [19]

Adams

[11] Patent Number: 4,821,483

[45] Date of Patent: Apr. 18, 1989

[54] METHOD FOR MANUFACTURING CONCRETE BLOCKS AND CONSTRUCTING FENCE

[76] Inventor: Raymond R. Adams, 117 W. Forest Grove, Phoenix, Ariz. 85051

[21] Appl. No.: 215,401

[22] Filed: Jul. 5, 1988

[51] Int. Cl.[4] .................................................. B28B 3/00
[52] U.S. Cl. ......................................... 52/747; 264/333
[58] Field of Search ......................... 264/69, 256, 333; 249/99, 101; 52/742, 747

[56] References Cited

U.S. PATENT DOCUMENTS

| | | | |
|---|---|---|---|
| 3,839,521 | 10/1974 | Robinson | 264/333 |
| 3,879,909 | 4/1975 | Lamoria et al. | 52/747 X |
| 3,972,969 | 8/1976 | Rio et al. | 264/333 X |
| 4,726,567 | 2/1988 | Greenberg | 52/747 X |

Primary Examiner—David A. Scherbel
Assistant Examiner—Anthony W. Williams

[57] ABSTRACT

An improved method for manufacturing concrete blocks and constructing fencing. The method produces a concrete structure which includes two distinct types of complementary irregularly shaped glass particles. The first type of particle has interstices which are filled with vesicles or cavities of varying shape and dimension and which are pierced with a system of canals and capillaries. The canals and capillaries open on the surface of the particle. The second type of particle has spheroid shaped cells or bubbles sealed inside the particle and has small craters or hollows formed on the surface of the particles.

2 Claims, 3 Drawing Sheets

METHOD FOR MANUFACTURING CONCRETE BLOCKS AND CONSTRUCTING FENCE

This invention relates to a method and apparatus for manufacturing concrete structures.

More particularly, the invention pertains to a manufacturing method in which concrete slurry utilized to make a structure sets quickly but gradually cures over a relatively long period of time, in which shrinkage of concrete slurry during drying is minimized but is great enough to facilitate removal from a mold of a concrete structure, and in which concrete structures manufactured in accordance with the method have low thermal conductivity and minimize the reflection and reverberation of sound by the structures.

In a further respect, the invention pertains to a method for making a concrete structure including two distinct types of complementary irregularly shaped glass particles, a first type of particle having interstices which are filled with vesicles or cavities of varying shape and dimension and which are pierced with a system of canals and capillaries, the canals and capillaries opening on the surface of the vesicular particle, and a second type of particle having spheroid shaped cells or bubbles sealed inside the particle and having small craters or hollows formed on the surface thereof, the sealed—bubble particles absorbing substantial amounts of water on their surfaces due to the hollows form thereon but rapidly giving off water while drying to facilitate hardening of slurry utilized to make a concrete structure, the vesicular particles including internal cavities and channels shaped and dimensioned to absorb water by capillary action and to retain amounts of air therein when immersed in water, the water and air stored in wetted vesicular particles being slowly released over time to facilitate curing of freshly poured concrete slurry containing the vesicular particles.

In another respect, the invention pertains to a method of the type described for forming a concrete structure, the vesicular particles being incorporated in the structure in a range of sizes which are generally concrete significantly larger than the sizes of the sealed--bubble particles utilized in the concrete structure.

In still a further respect, the invention pertains to a method of the type described in which the vesicular capillaried particles comprise 45% to 78.0% $SiO_2$.

In yet another respect, the invention pertains to a method for constructing a concrete block fence in which the fence is secured in position by compressing vertical columns of blocks at selected points spaced along the length of the fence.

In yet still a further respect, the invention relates to a method which significantly reduces the cost of constructing concrete block fencing.

Conventional concrete block fences are built with blocks produced from a slurry of concrete, water and sand aggregate. Blocks are stacked one on top of the other with mortar between adjoining blocks. Rebar and other types of reinforcing members are utilized to structurally strengthen the fence. The cost of constructing a concrete block fence which is six feet high is approximately $11.00 to $14.00 per linear foot in the Southwestern United States, where such fences are popular. While building a block fence is a relatively small matter, such construction is, by nature, labor intensive.

There are several other drawbacks associated with conventional concrete block fences. Such fences readily transmit sound and are brittle and shatter or "splinter" when struck with sufficient force. In addition, while the strength of conventional concrete block is acceptable for most fencing needs, the concrete slurry used to make the blocks is given a minimal amount of time in which to cure, resulting in concrete blocks which have substantially less strength than concrete which is poured for driveways, buildings, etc. and properly cured.

Accordingly, it would be highly desirable to provide a method for constructing concrete block fences which would substantially reduce the cost of installing such fences, and would provide fencing resistant to the reverberation of sound and having a reduced modulus of elasticity.

It would also be highly desirable to provide a method for manufacturing concrete blocks which would, while permitting freshly poured concrete to quickly initially "set", enable the blocks to slowly cure over an extended period of time.

Therefore, it is a principal object of the invention to provide an improved method and apparatus for manufacturing a concrete structure.

Another object of the invention is to provide an improved method for manufacturing concrete blocks, the method permitting freshly poured concrete blocks to quickly initially "set", while enabling the blocks to slowly cure over an extended period of time.

A further object of the invention is to provide an improved method for manufacturing concrete blocks, the method producing blocks which have a reduced modulus of elasticity and minimize the reverberation of sound therethrough.

Still another object of the instant invention is to provide an improved method of manufacturing concrete blocks which have low thermal conductivity and which, while experiencing relatively minimal amounts of shrinkage after being freshly poured in a mold, undergo shrinkage which is great enough to facilitate removal of the "green" block from the mold.

Yet a further object of the invention is to provide an improved method for constructing a concrete block fence, the method substantially reducing the present cost of building a concrete block fence.

These and other, further and more specific objects and advantages of the invention will be apparent to those skilled in the art from the following detailed description thereof, taken in conjunction with the drawings, in which.

Briefly, in accordance with my invention, I provide an improved method of manufacturing a concrete structure. The method comprises the steps of charging a mixer with a volume of wetted irregularly shaped vesicular glass particles the interstices of which are filled with cavities and pierced with a system of canals and capillaries, the canals and capillaries opening on the surface of the particles, and the cavities being shaped and dimensioned to absorb water by capillary action and to retain amounts of air therein when immersed in water, the vesicular particles being 45.0% to 78.0% $SiO_2$ and including $Fe_2O_3$, at least one chemical component from the group consisting of $K_2O$ and $CaO$, and at least one chemical component from the group consisting of $CaO$ and $Al_2O_3$; adding to the mixer a volume of irregularly shaped wetted glass particles, the interstices of which are primarily filled with bubbles sealed therein, and having hollows formed on the surface thereof, the sealed-bubble particles being 68.0% to 78.0% $SiO_2$ and including $Fe_2O_3$, at least one chemical component from the group consisting of $K_2O$ and $CaO$, and at least one chemical component from the group consisting of $CaO$ and $Al_2O_3$; adding an air entraining agent to the mixer; adding cement to the mixer; adding water to the mixer to form a slurry, the air entraining agent forming in the slurry small well-dispersed generally non-coalescing spheroids of air having diameters ranging from 0.003 to 0.05 inches; pouring the slurry into a mold; inducing vibrations into the slurry contained in the mold; curing the slurry to form a solid concrete block. During curing air and water retained in the vesicular particles gradually bleed from the vesicular particles through the capillaries and channels into surrounding cement to facilitate hardening and strengthening of the blocks.

The method of the invention can also include the steps of preparing a plurality of blocks in accordance with the method of manufacture described above; and, constructing a fence with the blocks. Construction of a fence includes the steps of preparing a footing having anchor points at spaced intervals therealong; stacking a plurality of blocks to form a plurality of horizontally extending rows one on top of the other; extending an elongate vertically oriented rod through the rows of blocks and attaching the lower end of the rod to one of the anchor points, the rod having an upper end extending above the horizontal rows of blocks; and, attaching plate means to the upper end of the rod to compress at least a portion of the rows between the plate means and the footing.

Figure 7:
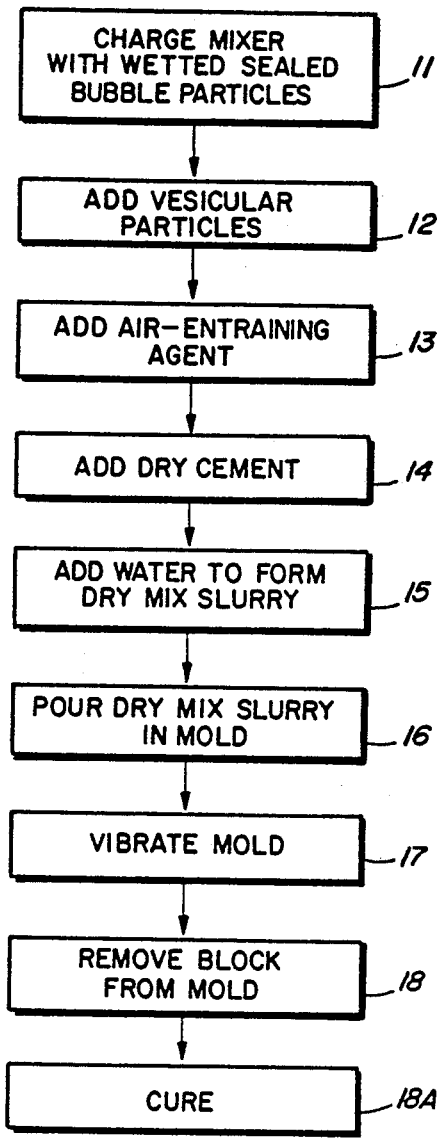
FIG. 7 is a block flow diagram illustrating a method for manufacturing concrete structures in accordance with the principles of the invention.

Turning now to the drawings, which depict the presently preferred embodiments of the invention for the purpose of illustrating the practice thereof and not by way of limitation of the scope of the invention and in which like reference characters refer to corresponding elements throughout the several views, FIG. 7 illustrates a method of manufacturing a concrete structure in accordance with the principles of the invention, including the step 11 of charging a mixer with wetted sealed-bubble glass particles, followed by adding 12 wetted vesicular glass particles to the mixer. An air entraining agent 13, dry cement 14, and water 15 are added to the mixer to form a dry mix slurry. The dry mix slurry is poured into a mold 16 which is vibrated 17. After the mold and slurry in the mold are vibrated, the hardened concrete slurry is removed from the mold 18 and cured 18A by allowing the concrete to dry and harden in at room temperature, by heating the concrete, or by other conventional curing methods.

The method of the invention utilizes a special aggregate combination of complementary glass particles having structures which facilitate the manufacture of concrete structures in accordance with the principles of the invention. A glass is an amorphous inorganic usually transparent or translucent substance consisting typically of a mixture of silicates or sometimes borates or phosphates. Glasses are often formed by fusion of sand or some other form of silica or by fusion of oxide of boron or phosphorous with a flux (as soda, potash) and a stabilizer (as lime, alumina) and sometimes metallic oxides or other coloring agents so that a mass is produced that cools to a rigid condition without crystallization and that may be blown, cast, pressed, rolled, drawn or cut into various forms. Quick cooling may, depending on the chemical composition of a liquid or semiliquid mass, be necessary to form a glass. Air or water vapor can be added to a soft or liquid glass composition to cause the formation of glass particles having sealed spheroids of bubbles of air and/or water vapor, and can also be utilized to form glass particles having vesicles and capillary channels therein Glasses typically contain $SiO_2$, $Al_3O_3$, $Fe_2O_3$, $FeO$, $CaO$, $MgO$, $Na_2O$, $K_2O$ and/or $TiO_2$.

Figure 8A:
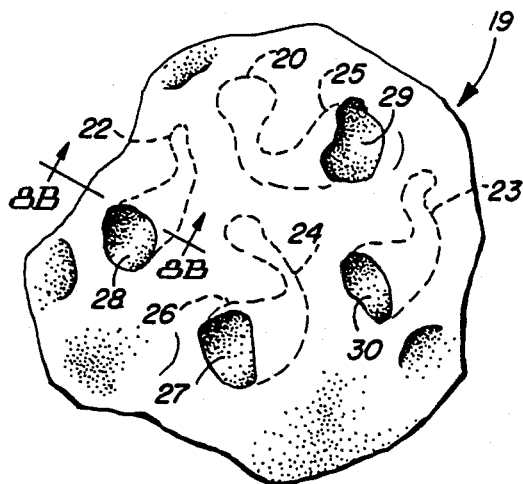
FIG. 8 is a perspective view illustrating a vesicular particle utilized in the method of the invention.
Figure 8B:
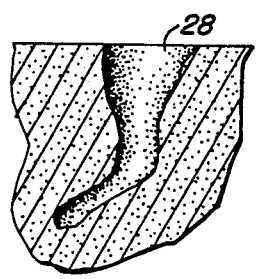

The two types of glass particles utilized in the practice of the invention each have an irregular outer surface to increase the surface area of the particles. The first type of particle, termed a vesicular particle, is illustrated in FIG. 8 and generally indicated by reference character 19. The interstices of particle 19 include cavities or vesicles 20, 21, capillary channels 22-24, and larger channels 26. The channels and capillaries lead to openings 27-30 on the outer surface of particle 19. When particle 19 is submersed in water, the channels and capillaries tend to draw water into the particle 19. However, air is often trapped at the end of a channel or capillary, for instance at the end of capillary 13 or in cavities 20 and 21, and, unless the particle is subjected to long periods of submersion or to violent mixing in the water, remains trapped in particle 19.

Figure 9A:
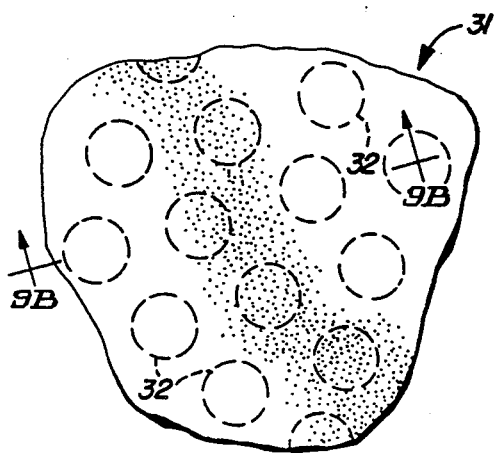
FIG. 9 is a perspective view illustrating a sealed-bubble particle utilized in the method of the invention; and, FIG. 10 is a perspective view further illustrating a sealed-bubble particle utilized in the practice of the method of the invention; and, FIG. 11 is a perspective view illustrating a block construction of the invention.
Figure 9B:
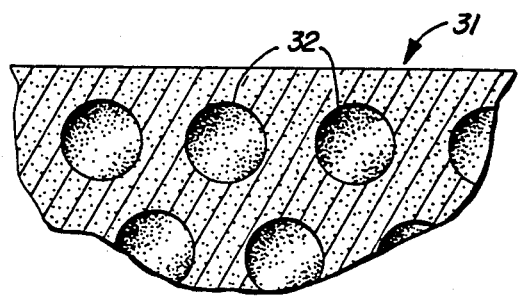
Figure 10A:
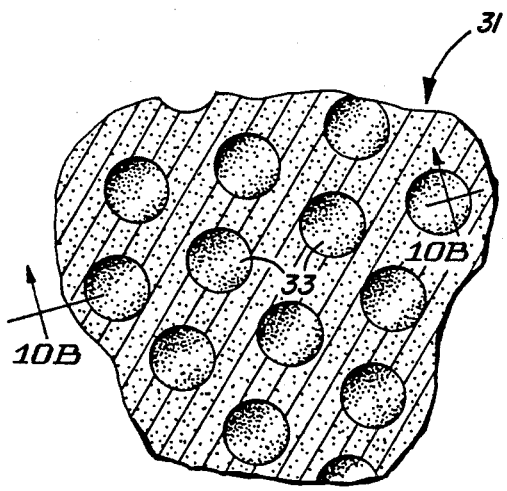
Figure 10B:
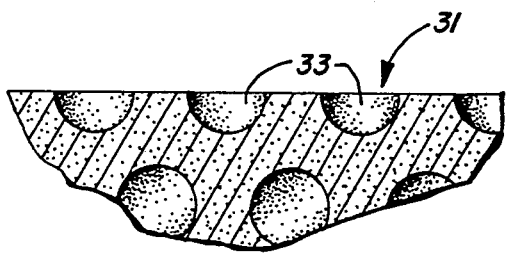

The second type of particle utilized in the practice of the invention is illustrated in FIGS. 9 and 10 and is termed a sealed-bubble particle because the interstice of the particle 31 contain a plurality of sealed spheroids or bubbles. In FIG. 9 particle 31 is, for sake of clarity, illustrated without showing the hollows or vacities 33 formed on the face or the particle.

The composition parameters of the vesicular particles are shown below in Table I.

TABLE I

| Composition of Vesicular Particles | |
|---|---|
| Component | Percent |
| $SiO_2$ | 45.0–78.0 |
| $Al_2O_3$ | 9.0–18.0 |

TABLE I-continued

| Composition of Vesicular Particles | |
|---|---|
| Component | Percent |
| $Fe_2O_3$ | 0.0–2.8 |
| FeO | 1.3–10.9 |
| CaO | 1.5–12.1 |
| MgO | 0.3–13.8 |
| $Na_2$ | 0.3–3.9 |
| $K_2O$ | 0.04–4.0 |
| $TiO_2$ | 0.0–3.1 |

The composition parameters of the sealed-bubble particles are below in Table II.

TABLE II

| Composition of Sealed-Bubble Particles | |
|---|---|
| Component | Percent |
| $SiO_2$ | 65.0–80.0 |
| CaO | >2.0 |
| $Fe_2O_3$ | >2.0 |

The glass sealed-bubble particles can also contain $K_2$, $Al_2O_3$, FeO, $Fe_2O_3$, MgO and traces of various other elements.

The presently preferred air entraining agent consists either of DAREX, a triethanolamine salt of sulphonate hydrocarbon or VINSOL, which consist of the petroleum hydrocarbon insoluble fraction of a coal-tar hydrocarbon extract of pine wood. Other suitable air entraining agents can be utilized.

The presently preferred specific gravity of a volume of sealed-bubble glass particles is 2.2 to 2.4. A volume of vesicular glass particles typically weighs from 25 to 45 lbs/ft³. A volume of sealed-bubble glass particles weighs from 4.0 to 10.0 lbs/ft³.

In the process of FIG. 7, the volume ratio of aggregate to cement is preferably 7:1, but can be in the range of 4:1 to 9:1. The slump of the slurry is produced during the process of FIG. 7 is in the range of 0.25 inch to 8.0 inches. Approximately one-half of the aggregate volume is presently comprised of vesicular particles and the other half comprised of sealed-bubble particles. The size of the sealed-bubble particles is normally less than 30 mesh, preferably 100 mesh. The vesicular particles range from 0.350 inches to 100 mesh or smaller in size. Typical breakdowns of vesicular particle aggregate is illustrated in Table III below.

TABLE III

| | Sizing of Vesicular Aggregate | | |
|---|---|---|---|
| Size Screen | Fine % Passing (by weight) | Coarse % Passing (by weight) | Fine and Coarse % Passing (by weight) |
| ½" | 100 | 100 | 100 |
| ⅜ | 90–100 | 80–100 | 90–100 |
| 4 mesh | 80–95 | 5–40 | 65–90 |
| 8 mesh | 40–80 | 0–20 | 35–65 |
| 16 mesh | 20–70 | 0–10 | |
| 30 mesh | 15–60 | | |
| 50 mesh | 10–50 | | 10–25 |
| 100 mesh | 5–30 | | 5–15 |

The diversity in the size of vesicular particles produces a significantly stronger concrete structure than if all vesicular particles are of a generally equal size. In addition to improving the overall strength of the concrete structure, the large vesicular particles store water and air in the manner earlier described and facilitate curing of the concrete structure over an extended period of time. As the size of vesicular particles decreases, the proportion of their volume which is available to store water and air decreases. It is important that the slurry 15 produced in the process of FIG. 7 include larger sized vesicular aggregate particles sized in the range of 30 mesh to 0.5 inches.

Relatively small 100 mesh sealed-bubble glass particles are preferred in the method of FIG. 7 because they provide a large surface area for initially capturing water during mixing of concrete slurry and then dry relatively rapidly to facilitate the initial "setting" and hardening of the slurry so the concrete can rapidly bear a minimal amount of weight and will hold its form if removed from a mold. In addition, the small irregular shaped sealed-bubble particles tend to lodge in openings in the larger vesicular particles, facilitating the drawing out of water from the vesicular particles during curing of a concrete structure. Finally, the irregular outer surfaces and edges of vesicular and sealed-bubble particles tend to be the points at which the particles contact one another in a concrete structure produced according to FIG. 7. When a load is applied to the structure, the edges tend to fracture, causing the glass particles to move closer together and interlock. This minute fracturing of the edges of the glass particles provides the concrete structure with a greater elasticity and a lower modulus of elasticity than is found in conventional concretes and makes the concrete structures of the invention less brittle. The water and air retained in the vesicular particles also contribute to the increased elasticity of the concrete structure.

A typical breakdown of sealed-bubble aggregate is shown below in Table IV.

TABLE IV

| Sizing of Sealed-Bubble Aggregate | |
|---|---|
| Size Screen | % Passing (by weight) |
| 8 mesh | 80–100 |
| 16 mesh | 70–95 |
| 30 mesh | 39–85 |
| 50 mesh | 14–63 |
| 100 mesh | 0–14 |

Figure 1:
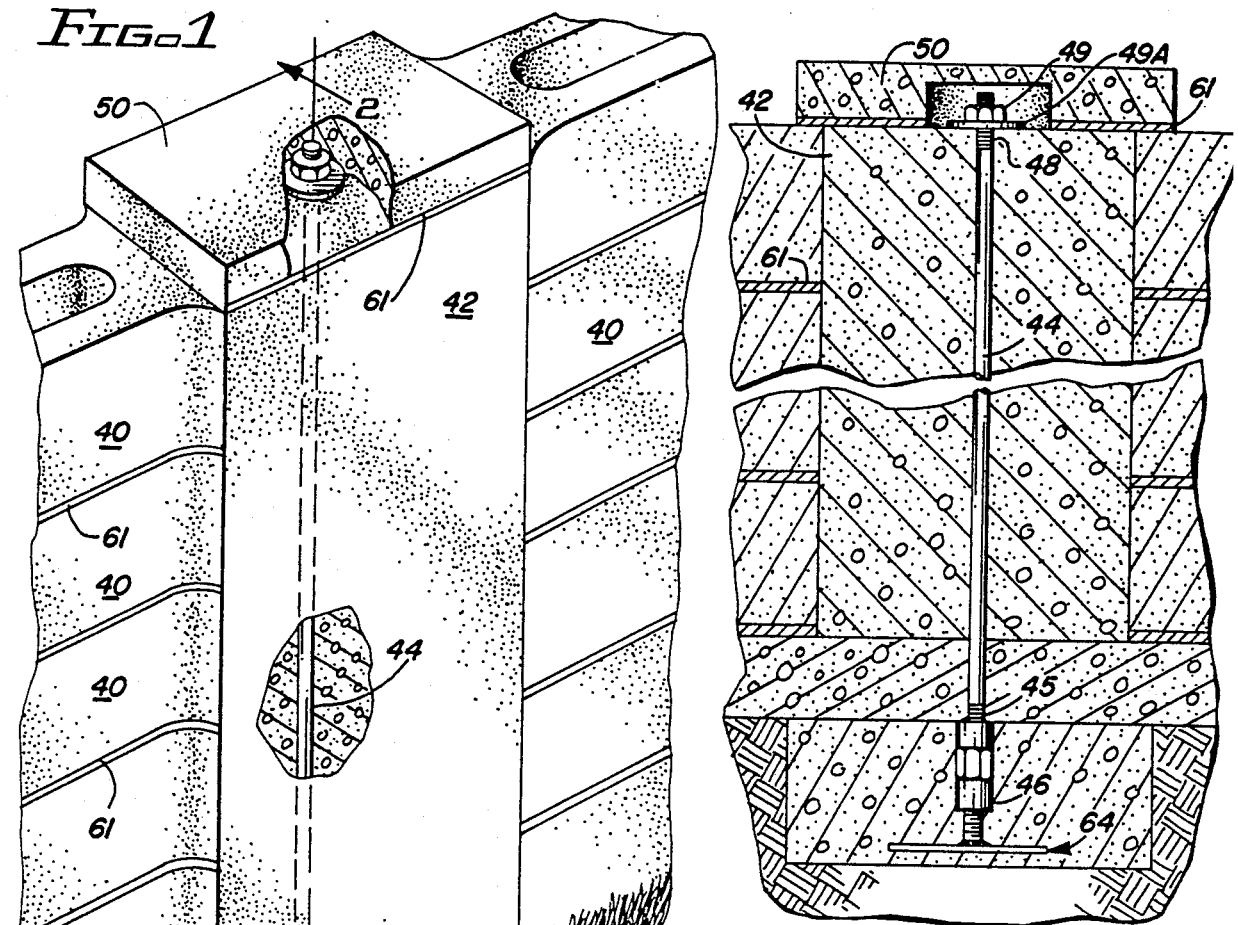
FIG. 1 is a perspective view illustrating a fence constructed in accordance with the principles of the invention.
Figure 2:
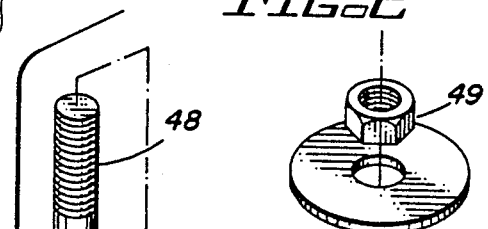
FIG. 2 is a front section view of the fence of FIG. 2 taken along section line 2—2 thereof and further illustrating internal construction details thereof.
Figure 4:
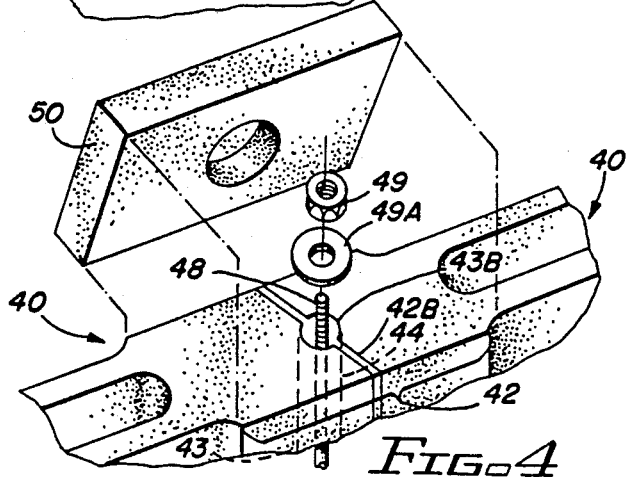
FIG. 4 is a top section view illustrating the top of a concrete structure constructed in accordance with the invention.
Figure 3:
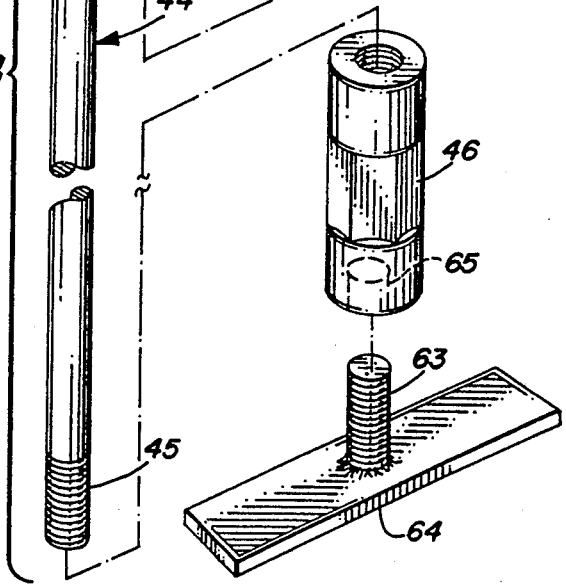
FIG. 3 is an exploded assembly view of the compressive rod assembly utilized in manufacturing a concrete structure in accordance with the invention.
Figure 5:
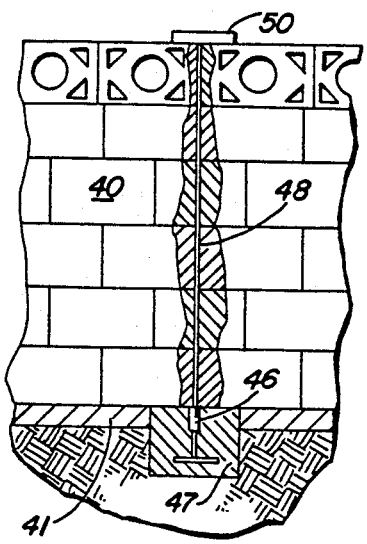
FIG. 5 is a front view of a concrete structure constructed in accordance with the invention and including a portion thereof broken away to illustrate the utilization of the compressive rod assembly of FIG. 3 therein.
Figure 6:
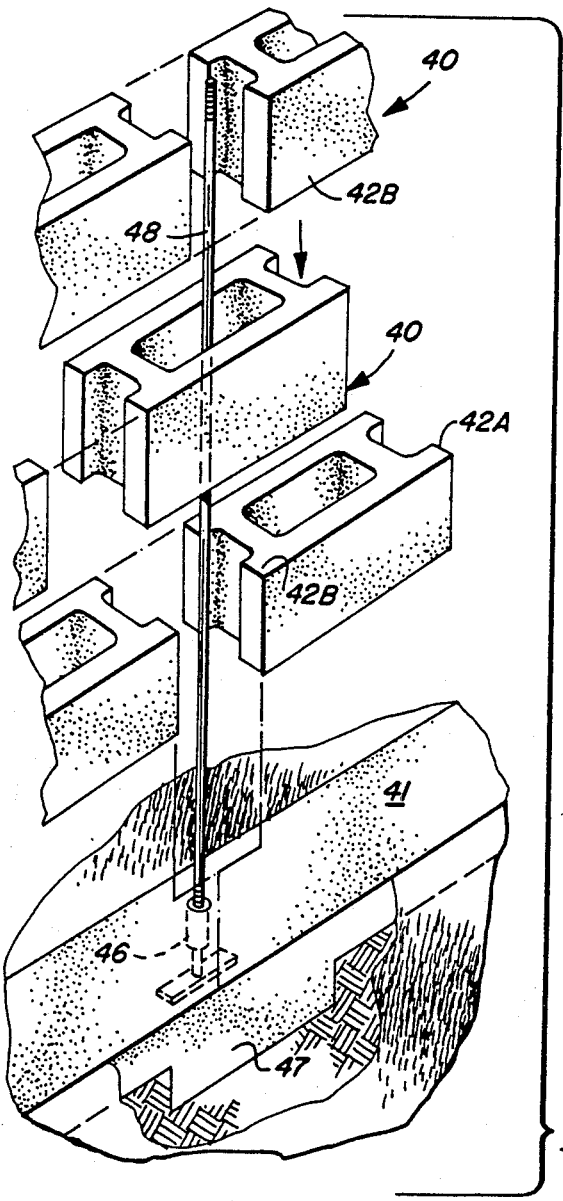
FIG. 6 is an exploded assembly view of a portion of the structure of FIG. 5.

FIGS. 1–3 and 4–6 illustrate a fence constructed with concrete blocks produced utilizing the method of FIG. 7. The concrete structure of FIGS. 1–3 and 4–6 includes blocks placed on top of footing 41 to form horizontal rows of blocks one on top of the other. As illustrated in FIG. 4, each column 42 in the fence can be comprised of portions 42A and 42B integrally formed in blocks 40 as the end portions thereof. Elongate semicircular hollows 43A, 43B are also formed in the ends of each block to receive horizontally disposed elongate rod 44 extending downwardly through aperture 43. In FIGS. 1 and 2, column 42 is a solid poured post The lower end 45 of rod 44 is externally threaded and is turned into internally threaded anchor 46 fixedly maintained in pier 47 of footing 41. The upper end 48 of rod 44 is also externally threaded and receives a nut 49 having an internally threaded aperture 60 to receive end 48. Nut 49 is turned onto rod 44 to compress blocks 40 and/or the ends 42A, 42B of blocks 40 together between pier 41 and nut 49. Washer 49A is intermediate not 49 and column 42. A hollow capstone 50 is placed over nut 49. Adjacent blocks 40 can be secured to one another with mortar, protex epoxy, or other types of adhesive 61. Externally threaded upwardly projecting arm 63 of foot 64 is rotably received by internally threaded aperture 65 in anchor 46.

Fiberglass particles can be intermixed with the glass-cement concerete blocks of the invention.

Figure 11:
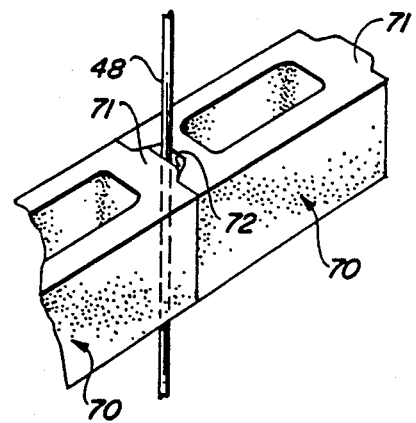

FIG. 11 illustrates an interlocking block construction which ovbiates the need to apply adhesive at the vertical joints of adjoining blocks. Blocks 70 each include a vertically extending groove or indent 72 formed in one end and a vertically extending nose 71 formed at the other end. Nose 71 interfits with an indent 72 in an adjacent block 70 as shown in FIG. 11. When nose 71 interfits with an indent 72, there is sufficient space remaining in indent 72 to permit a rod 48 to vertically extend upwardly through indent 72. When the interlocking blocks of FIG. 11 are utilized, adhesive only need be applied to the horizontal surfaces of blocks 70 and not to the vertical surface of the blocks.

Having described my invention in such terms as to enable those skilled in the art to understand and practice it, and having identified the presently preferred embodiments thereof, I claim:

1. A method of manufacturing a concrete structure, comprising the steps of:
   (a) charging a mixer with a volume of wetted irregularly shaped vesicular glass particles having a weight in the range of 25 to 45 lbs/ft$^3$, the interstices of which are filled with cavities and pierced with a system of canals and capillaries,
   (i) the canals and capillaries opening on the surface of the particles, and
   (ii) the cavities being shaped and dimensioned to absorb water by amounts of air therein when immersed in water,
   said vesicular particles being 45.0% to 78.0% $SiO_2$ and including
   (iii) $Fe_2O_3$,
   (iv) at least one chemical component from the group consisting of $K_2O$ and $CaO$, and
   (v) at least one chemical component from the group consisting of $CaO$ and $Al_2O_3$,
   (vi) at least thirty-five percent by weight of said vesicular aggregate particles being larger than thirty mesh and equal to or less than one-half inch in size, the remaining particles having a size of 16 mesh or less;
   (b) adding to the mixer a volume of wetted sealed-bubble glass particles,
   (i) the interstices of which are primarily filled with bubbles sealed therein, and
   (ii) having hollows formed on the surface thereof, said sealed-bubbled particles being 68.0% to 78.0% $SiO_2$ and including
   (iii) $Fe_2O_3$,
   (iv) at least one chemical component from the group consisting of $K_2O$ and $CaO$, and
   (v) at least one chemical component from the group consisting of $CaO$ and $Al_2O_3$, at least seventy percent by weight of said sealed-bubble particles being 100 mesh or less in size;
   (c) adding an air entraining agent to the mixer;
   (d) adding cement to the mixer, the ratio of the combined volume of vesicular particles and sealed-bubble particles to the volume of cement being in the range of 6:1 to 8:1;
   (e) adding water to the mixer to form a slurry, said air entraining agent forming in said slurry small well-dispersed generally noncoalescing spheriods of air having diameters ranging from 0.003 to 0.05 inches;
   (f) pouring said slurry into a mold;
   (g) introducing vibrations into the slurry container in said mold; and,
   (h) curing said slurry to form a hollow concrete block, air and water retained in said vesicular particles gradually bleeding from said vesicular particles through said capillaries and channels into surrounding cement to facilitate curing of said blocks.

2. The method of claim 1, including the steps of:
   (a) repeating steps (a)–(h) to produce a plurality of hollow concrete blocks (40), each block having a nose (71) on one end and an indent (72) on the other end to receive and interlock with the nose of another block, said nose and indent of each block being shaped, contoured and dimensioned such that when the nose of one block interlocks with the indent of another block a vertical open space is formed between the nose and a portion of the indent; each block having a central hollow area extending vertically through said block, and having upper and lower parallel horizontal faces and vertical end faces;
   (b) constructing a fence of interlocking blocks, the width of said blocks and said fence being constant along the length thereof, said fence not including at selected intervals intermediate the ends of said fence support columns of blocks having a greater width than said interlocking blocks, said construction including the steps of,
   (i) preparing a concrete footing (41) in the ground having anchors (46) buried at spaced intervals therein,
   (ii) using adhesive (61) to secure the bottom horizontal surfaces of an interlocked row of blocks to said footing with at least one of the nose and indent of each block in said row interlocked with an adjacent block to form interlocking nose-indent joints, the vertical faces of one block not being secured to the vertical faces of an adjacent block with adhesive;
   (iii) placing additional rows of interlocking blocks on top of said first row of blocks, said upper and lower horizontal surfaces of adjacent blocks in said rows being secured together with adhesive, at least one of said nose and indent of each block in a row being interlocked with an adjacent block to form interlocking nose-indent joints, said nose-indent joints in each of said rows being offset from said nose-indent joints in rows adjacent and connected to said each of said rows:
   (iv) extending an elongate vertically oriented rod (48) through said rows of blocks and attaching the lower end of said rod to one of said anchors (46), said rod having an upper end extending above said horizontal rows of blocks, said rod extending through aligned ones of said vertical open spaces formed at said nose-indent joints and central hollow areas;
   (iv) attaching plate means to said upper end of said rod to compress at least a portion of said rows between said plate means and said footing;
   said fence consisting solely of said interlocking blocks (40), footing (41), anchors (46), rod (48), adhesive (61), and plate means.

* * * * *